Sept. 13, 1927.  S. LOWENSTEIN  1,642,255
BEDPAN
Filed March 25, 1922
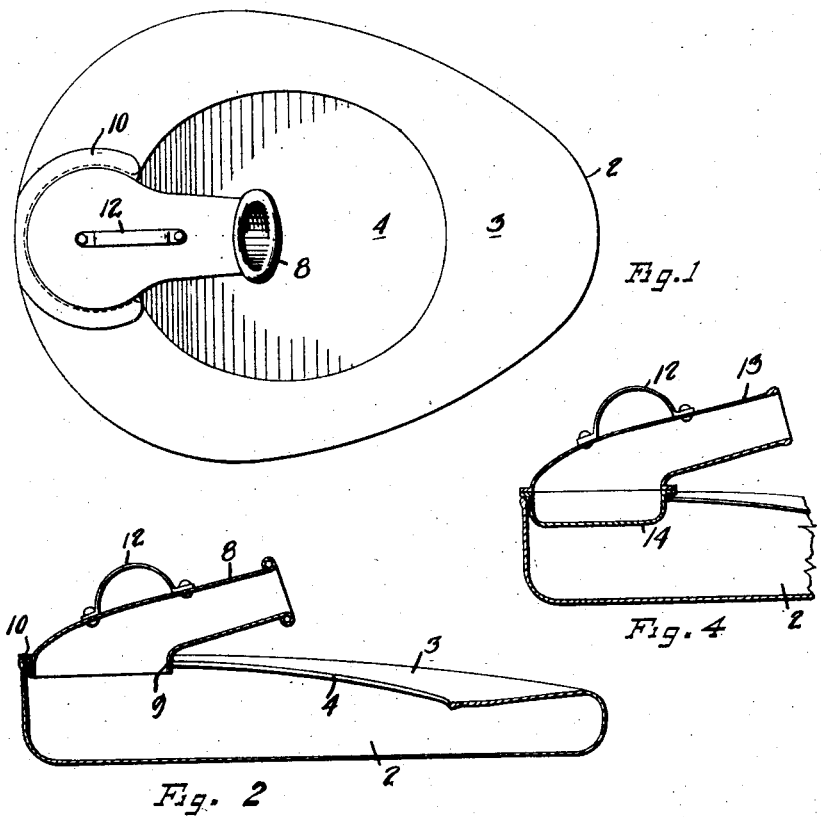
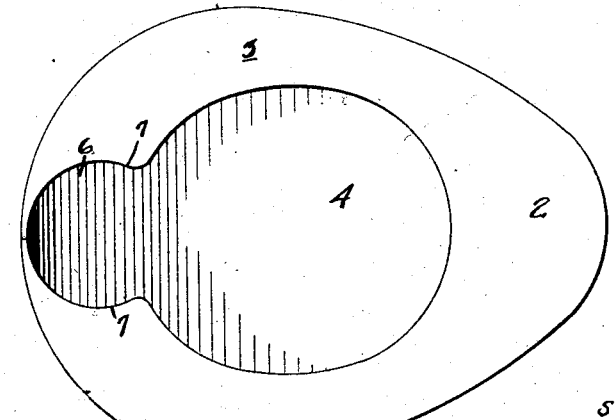
INVENTOR.
S. LOWENSTEIN
BY Joseph B. Gardner
his ATTORNEY Patented Sept. 13, 1927.

1,642,255

UNITED STATES PATENT OFFICE.

SAMUEL LOWENSTEIN, OF OAKLAND, CALIFORNIA, ASSIGNOR TO HARRY LOWENSTEIN, OF SAN FRANCISCO, CALIFORNIA.

BEDPAN.

Application filed March 25, 1922. Serial No. 546,667.

My invention relates to bed pans such as are adapted for the convenience of invalids particularly males who are unable to leave their beds when they desire to urinate or allow their bowels to function.

An object of the invention is to provide a bed pan in which the urinal member and bowl are separable but may be joined and firmly held in joined position.

Another object of the invention is to provide a bed pan with the foregoing features, which is extremely simple in construction and inexpensive to manufacture.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is top view of the pan with the urinal member positioned thereon.

Figure 2 is a vertical sectional view of the pan as shown in Figure 1.

Figure 3 is plan view of the pan with the urinal member removed.

Figure 4 is fragmentary section of a slightly modified form of construction.

It has been found that for the purposes of construction and for the convenience of the invalids using the pans, that it is of considerable advantage to form the urinal member of the pan separate of the bowl of the pan. This construction however has heretofore had a disadvantage, in that the invalid was forced to hold the urinal member with his hands while the bed pan was in use. The usual weak condition of the invalid as well as the fatigue resulting from holding the urinal more or less any extended length of time, frequently resulted in the invalid releasing his hold on the urinal member and thereby causing it to slip and discharge its contents over the bed clothes—a most annoying situation to say the least. In accordance with my invention the foregoing disadvantageous feature of the separated type of bed pan is eliminated, and the advantageous features retained.

Briefly expressed the bed pan of my invention in its preferred embodiment comprises a bowl or pan having at one edge of the main opening a branch opening over and in which the separable urinal member is adapted to be removably but firmly fitted.

A detailed description of the device follows:

The bed pan comprises a bowl or pan 2 provided with a top plate 3 having a main central opening or orifice 4. Formed at the forward end of the opening 4 is a branch opening 6 the opposite edge portions 7 of which adjacent the main opening converge to said latter opening.

Arranged to be fitted over the branch opening 6 is the urinal member 8 which in the embodiment shown in Figures 1 and 2 is formed with an open bottom. The shape of the member 8 adjacent its lower extremity corresponds with the outline of the branch opening, and the walls 9 of said portion of the member are adapted to extend down into said opening and fit against the edges thereof. The member is held in proper position on the pan by the aid of a shoulder 10 provided on the outer side of the member above its bottom and adapted to rest on the top plate of the pan. Owing to the constricted area of the branch opening at its rear edge the urinal member when set in the opening will be prevented from slipping backward into the main opening. It will thus be apparent that when the urinal member is properly positioned in its opening it will be firmly held on the pan without aid on the part of the invalid.

By means of the handle 12 the urinal member may be removed from engagement with the pan or replaced in engagement therewith with extreme readiness.

In Figure 4 I have shown a slightly modified form of construction. In this embodiment the urinal member 13 is provided with a bottom plate 14, thereby enabling the urine to be collected separately, and also enabling the use of the urinal member without the pan.

I claim:

1. In a device of the character described, a bed pan having an opening therein, a urinal member arranged to removably fit and be held in said opening, and having a portion thereof arranged to extend outwardly from the pan and a portion arranged to extend inwardly therein, the outwardly extending portion of said member having an inlet opening, and the inwardly extending portion defining a chamber sealed from the interior of the pan, said member being so positioned with respect to the pan that the user may operatively use the pan and member simultaneously.

2. In a device of the character described, a bed pan having an opening therefor, a tubular inflexible urinal member arranged to be removably held thereon and having a portion arranged to extend outwardly from the pan and a portion arranged to extend inwardly therein, said urinal member having an inlet opening in the outer extremity thereof and being so positioned relative to the pan opening that both the pan and urinal member may be used simultaneously by one person.

In testimony whereof, I have hereunto set my hand at Oakland, this 15th day of March, 1922.

SAMUEL LOWENSTEIN.